(12) United States Patent
Lin et al.

(10) Patent No.: US 7,367,556 B2
(45) Date of Patent: May 6, 2008

(54) SHEET-HANDLING APPARATUS

(75) Inventors: Chih-Ming Lin, Tu-Cheng (TW);
Chih-Yang Chen, Tu-Cheng (TW);
Huan-Hsing Hsiao, Tu-Cheng (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 338 days.

(21) Appl. No.: 11/301,984

(22) Filed: Dec. 13, 2005

(65) Prior Publication Data

US 2007/0132171 A1 Jun. 14, 2007

(51) Int. Cl.
*B65H 3/06* (2006.01)
(52) U.S. Cl. ........................ 271/118; 271/117; 271/4.04
(58) Field of Classification Search ............... 271/4.04, 271/117, 118
See application file for complete search history.

(56) References Cited

U.S. PATENT DOCUMENTS

| | | | | |
|---|---|---|---|---|
| 5,090,675 A * | 2/1992 | Nagai et al. | ............. | 271/10.12 |
| 5,497,986 A * | 3/1996 | Kudo | ........................ | 271/122 |
| 5,551,684 A * | 9/1996 | Sata | ........................... | 271/110 |
| 5,755,435 A * | 5/1998 | Fujiwara | .................... | 271/4.04 |
| 6,024,356 A * | 2/2000 | Tanaka et al. | ......... | 280/11.214 |
| 6,390,463 B1 * | 5/2002 | Iwago | ........................ | 271/118 |
| 6,547,235 B2 * | 4/2003 | Higaki | .................... | 271/10.01 |
| 6,974,127 B2 * | 12/2005 | Kang | .................... | 271/10.11 |

* cited by examiner

*Primary Examiner*—Patrick Mackey
*Assistant Examiner*—Howard Sanders

(57) ABSTRACT

A sheet-handling apparatus includes a base, a second motor and a sheet-fetching assembly driven by the second motor. The sheet-fetching assembly has a passive gear and a floating gear. When the passive gear rotates, the floating gear revolves around the passive gear. A plurality of driving rollers are driven by a first motor. A plurality of driven rollers are driven by driving rollers, respectively. A prop assembly includes a brace arranged in the base, a prop axel engaged in the brace, a twist arm fixed at the prop axel and having a plurality of teeth for contacting with the floating gear, a swimming arm sleeved and firmly engaged with the swimming arm and a spring component installed on a support board of the swimming arm. The passive gear drives the floating gear descending and ascending. There are two motors provided in the sheet-handling apparatus in order to simplify the structure of the sheet-handling apparatus.

6 Claims, 15 Drawing Sheets

SHEET-HANDLING APPARATUS

BACKGROUND OF THE INVENTION

1. Field of the Invention

The present invention relates to a sheet-handling apparatus used for an image reading machine such as a copying machine and arranged to feed a document or a paper sheet on which an image is to be transferred, and more specifically to a sheet handling apparatus for two-side scanning and copying.

2. The Related Art

In an image reading machine or an image forming machine, such as a copying machine, a printer, an image reader, a facsimile or the like, the machine is provided with a sheet-handling apparatus for automatically feeding a sheet into the machine.

Generally, a sheet-handling apparatus comprising a sheet-fetching apparatus, a transporting assembly and sheet channels. The sheet-fetching apparatus fetches a sheet and sends the sheet into the sheet channels. The transporting assembly delivers the sheet to an image-processing area. After an image processed, the paper is sent out of the machine.

In order to effectively utilize the sheet, this image reading machine deals with the sheet on both sides of the sheet. A sheet-handling apparatus is provided for delivering a sheet into the machine for scanning or printing an image on one side of the sheet, then delivering the sheet into the machine again for scanning or printing an image on the other side of the sheet.

The sheet-handling apparatus comprises a sheet-fetching assembly, a transporting assembly and sheet channels. The sheet-fetching assembly fetches a sheet and sends the sheet to the sheet channels. The sheet channels comprise a first channel and a second channel. An image-processing area is arranged in the first channel. The second channel sends the one-side processed sheet to the image-processing area. The transporting assembly comprising a plurality of rolling wheels, a plurality of inert wheels, an exit-rolling wheel and an exit idle wheel. The exit rolling wheel and the exit idle wheel are located at a sheet exit. In general, a special motor drives the sheet-fetching assembly. When the motor running clockwise, the sheet-fetching assembly fetches a sheet. When the motor running counterclockwise, the sheet-fetching assembly rises. The exit-rolling wheel and the rolling wheels are driven by a sheet-feeding motor. The sheet-feeding motor runs reversely, so that the sheet is sent to the second channel.

While the sheet-handling apparatus works, the sheet-fetching assembly fetches the sheet into the first channel, then the paper is delivered to the image-processing area. After the sheet is sent to the exit-rolling wheel, the sheet is sent to the sheet exit. While the end of the sheet passes through the exit rolling wheel and the exit idle wheel, the exit-rolling wheel drives reversely, the sheet is sent to the second channel, and then the paper is delivered to the first channel. So that, the other side of the sheet is processed.

However, the structure of the conventional sheet-handling apparatus is very complex. Especially, the sheet-handling apparatus has many motors. For the motors, the sheet-handling apparatus has to arrange a lot of additional parts, such as speed-reducing gears, control means, linking elements, etc. Therefore, the structure of the sheet-handling apparatus is complex. Of course, it is not convenient for assembling, repairing and maintaining the sheet-handling apparatus.

SUMMARY OF THE INVENTION

The primary object of the invention is to provide a sheet handling apparatus. The sheet-handling apparatus comprises a base, a first motor, a second motor and a sheet-fetching assembly driven by the second motor. The sheet-fetching assembly has a passive gear and a floating gear. When the passive gear rotates, the floating gear revolves around the passive gear. A plurality of driving rollers are driven by the first motor. A plurality of driven rollers are driven by the driving rollers, respectively. A prop assembly includes a brace arranged in the base, a prop axel engaged in the brace, a twist arm fixed at the prop axel and having a plurality of teeth for contacting with the floating gear, a swimming arm for allowing a prop axel to be sleeved and firmly engaged with the swimming arm and a spring component installed on a support board of the swimming arm. The passive gear drives the floating gear descending and ascending. There are two motors provided in the sheet-handling apparatus in order to simplify the structure of the sheet-handling apparatus.

These and other features, objects and advantages of the present invention will be more fully apparent from the following detailed description set forth below when taken in conjunction with the accompanying drawings.

DETAILED DESCRIPTION OF THE PREFERRED EMBODIMENTS

Figure 1:
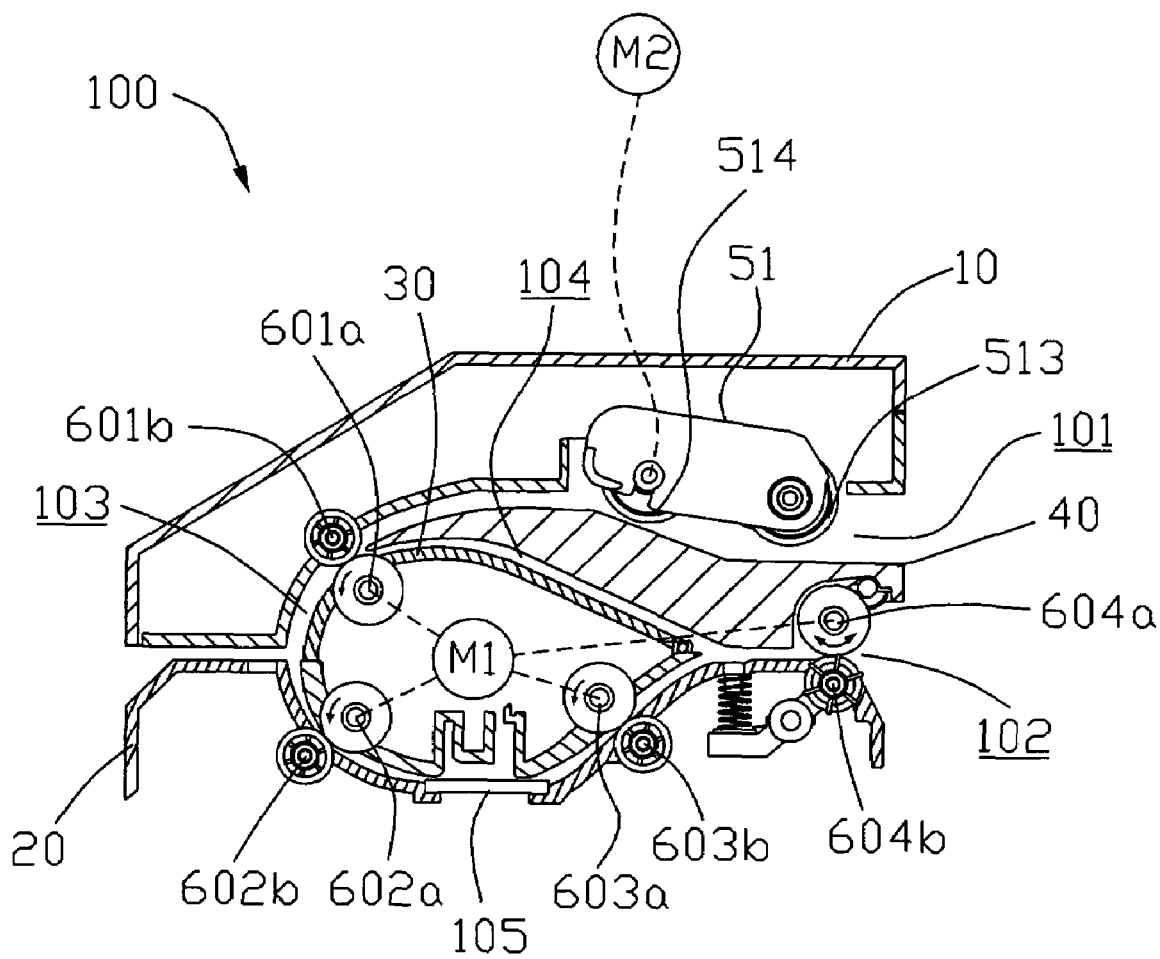
FIG. 1 is a cross-sectional view illustrating a sheet-handling apparatus of the present invention.

For facilitating understanding, like components are designated by like reference numerals throughout the various embodiments of the invention as shown in the attached drawings.

FIG. 1 is a cross-sectional view illustrating a sheet-handling apparatus 100 according to an embodiment of the present invention. The sheet-handling apparatus 100 comprises a base 20 located at the lower end of the sheet-handling apparatus 100, an inner cover 40 covering on the base 20, a guidance assembly 30 installed between the base 20 and the inner cover 40, a top cover 10 which covers the inner cover 40, the guidance assembly 30 and the base 20. The base 20 and the inner cover 40 forms a cavity.

A first channel 103 is located between the guidance assembly 30 and the base 20 and between the guidance assembly 30 and the top cover 10. A second channel 104 is located between the inner cover 40 and the guidance assembly 30. The first channel 103 communicates with the second channel 104. A sheet entrance 101 is formed at the outer end of the second channel 104 and a sheet exit 102 is formed at the outer end of the first channel 103. A processing window 105 is arranged at the base 20.

A plurality of driving rollers 601a, 602a, 603a and driven rollers 601b, 602b, 603b and exit driving roller 604a and exit driven roller 604b are arranged along the first channel 103. The driving rollers 601a, 602a, 603a and the exit driving roller 604a are driving by the first motor M1. The first motor M1 is arranged in the cavity formed by the base 20 and the inner cover 40. The driven rollers 601b, 602b, 603b and the exit driven roller 604b are driven by the driving rollers 601a, 602a, 603a and the exit driven roller 604a, respectively. It is obvious that the driven rollers 601b, 602b, 603b and the driving rollers 601a, 602a, 603a are paired arrangement. The exit driven roller 604b and the exit driving roller 604a are paired arrangement. Since the exit driving roller 604a and the exit driven roller 604b are located at the sheet exit 102.

Figure 2:
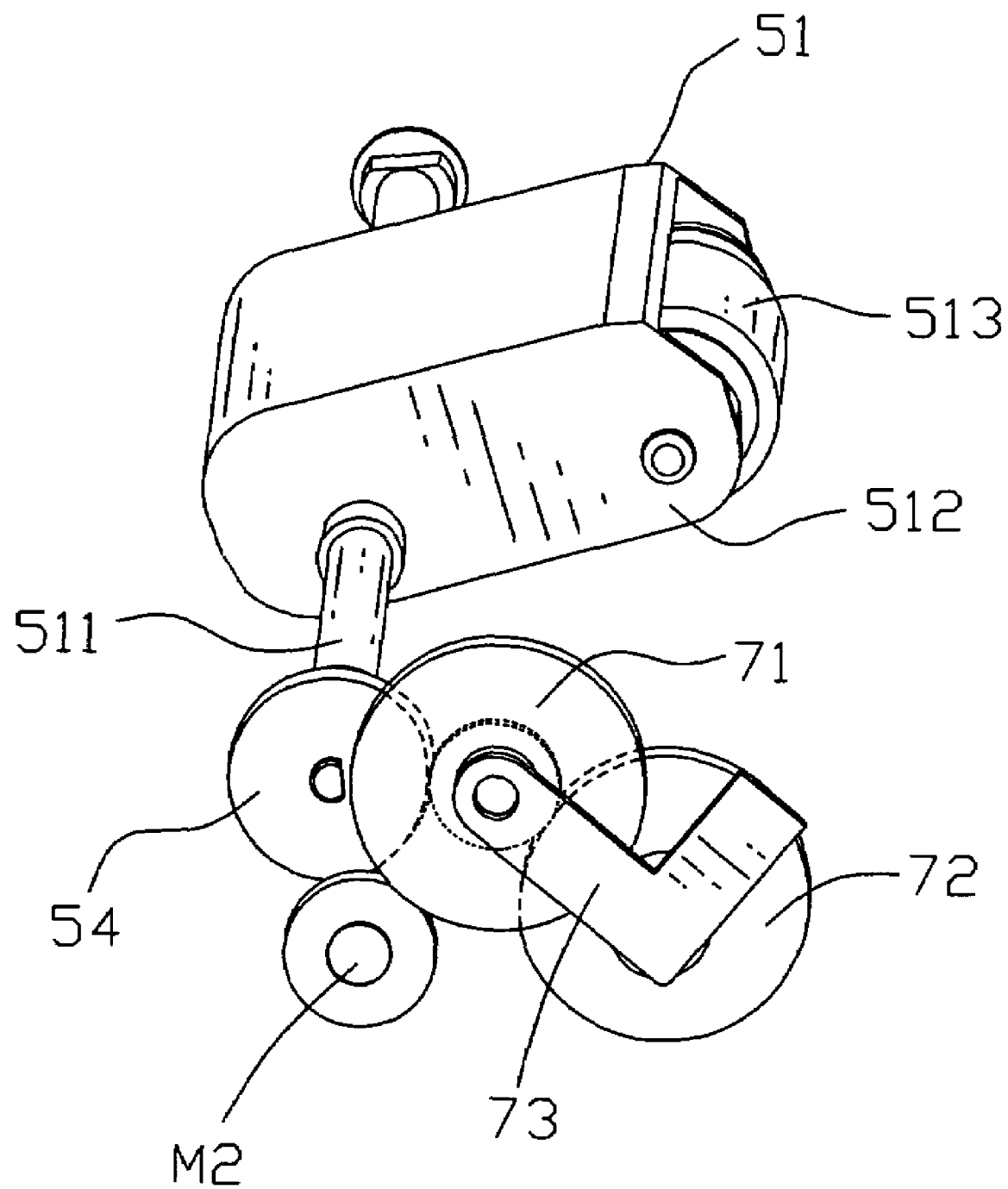
FIG. 2 is a perspective view of a sheet-fetching assembly.

A sheet-fetching assembly 51 is contained inside of the top cover 10. As shown in FIGS. 1 and 2, the sheet-fetching assembly 51 comprises a feeding roller 514 (referring to FIG. 3) and a preliminary feeding roller 513. The feeding roller 514 is arranged near the preliminary feeding roller 513. The feeding roller 514 is driven by a second motor M2 and drives the preliminary feeding roller 513 rotating. A document, such as a sheet, is seated at the sheet entrance 101 and fed into the first channel 103 by the preliminary feeding roller 513 and the feeding roller 514. A bracket 512 partially covers the feeding roller 514 and the preliminary feeding roller 513. The feeding roller 514 has an axle 511 extending through the bracket 512. A swimming gear 54 is engaged at the end of the axle 511. The second motor M2, such as a pulse motor or the like, is arranged for counterclockwise and clockwise driving the feeding roller 514. A passive gear 71 includes an outer gear and an outer gear. The second motor M2 meshes with the outer gear of the passive gear 71. The swimming gear 54 meshes with the inner gear of the passive gear 71. A connecting arm 73 engages with the passive gear 71 and a floating gear 72. The floating gear 72 meshes with the inner gear of the passive gear 71. The passive gear 71 has a fixed axle, so that the passive gear 71 does not have relative motion with the cover 10 and the base 20. The floating gear 72 revolves around the passive gear 71 while the floating gear 72 revolves around its own axis.

A front swimming gear 515 is engaged with the preliminary feeding roller 513. A unidirectional clutch OW1 is located between the front swimming gear 515 and the preliminary feeding roller 513 and engaged with the bracket 512. A rear swimming gear 516 is engaged with the fetching wheel 514. A middle gear 517 is engaged between the rear swimming gear 516 and the front swimming gear 515.

Figure 3:
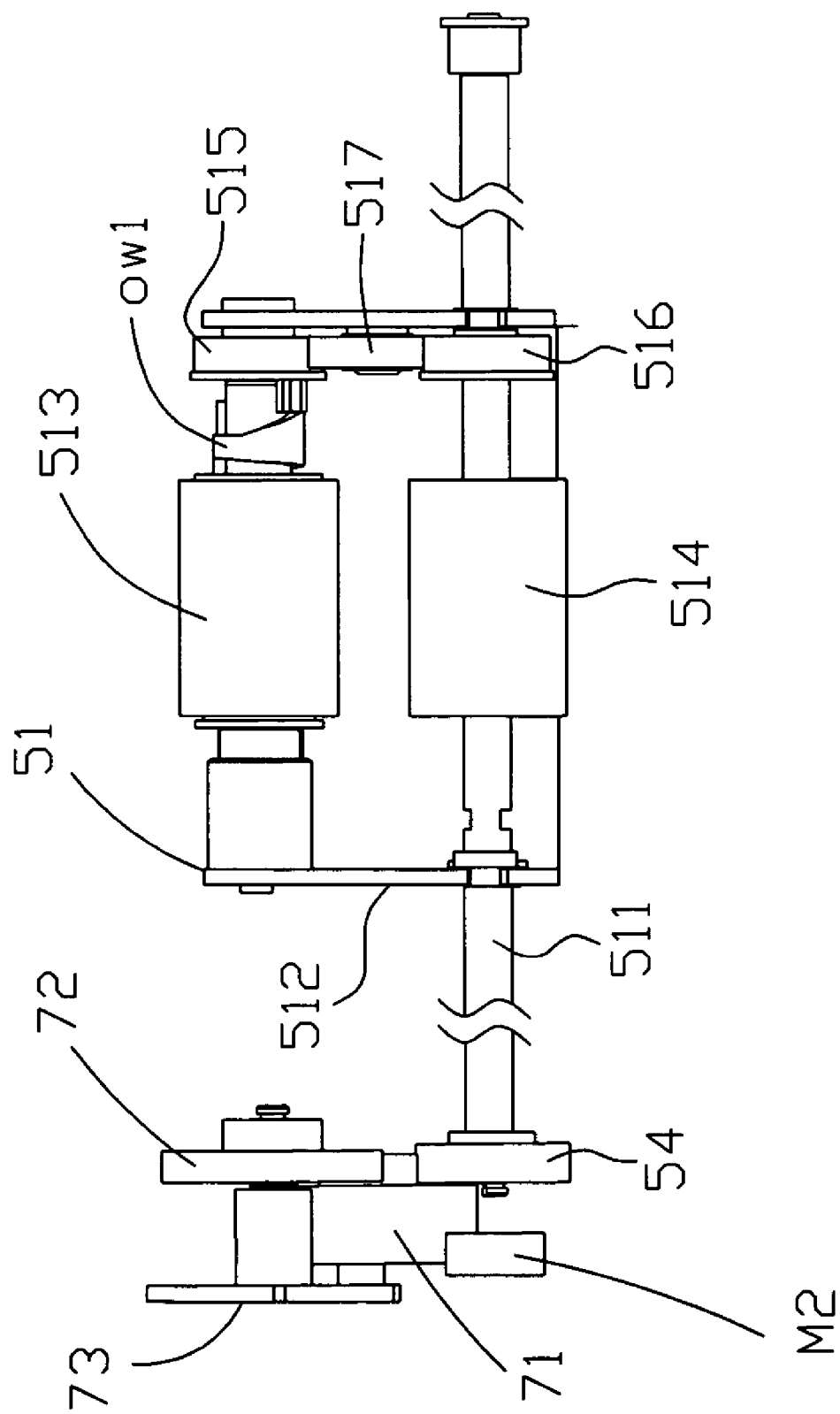
FIG. 3 is a plane view of the sheet-fetching assembly shown in FIG. 2.
Figure 4A:
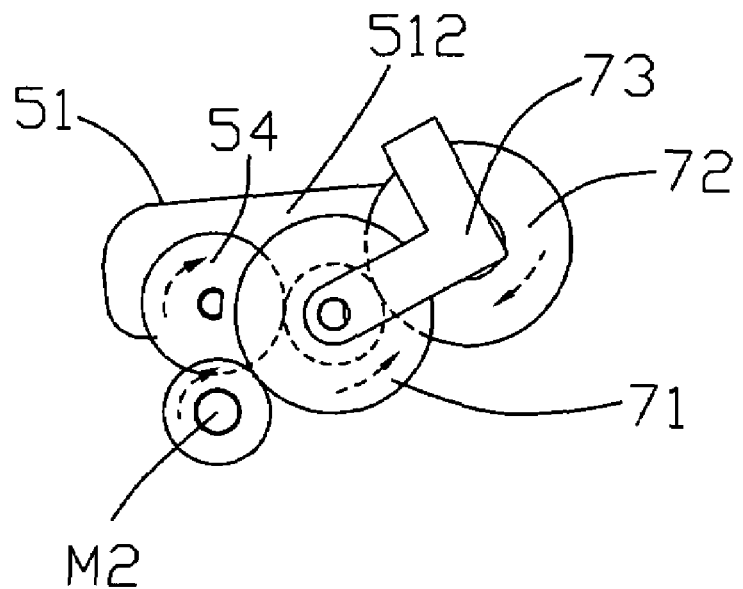
FIGS. 4(A) and 4(B) show the sheet-fetching assembly ascending and descending.

Please refer to FIG. 4(A) and FIG. 3. While the second motor M2 rotates clockwise, the passive gear 71 rotates counterclockwise, so that the floating gear 72 revolves clockwise and the swimming gear 54 revolves clockwise. The axle 511 is driven to revolve clockwise by the swimming gear 54. The axle 511 drives the feeding roller 514 to revolve clockwise. The rear swimming gear 516 drives the front swimming gear 515 to revolve clockwise through the middle gear 517, so the preliminary feeding roller 513 is driven to revolve clockwise by the front swimming gear 515 and the unidirectional clutch OW1. When the front portion of the bracket 512 is descend, the preliminary feeding roller 513 fetches a sheet located at the sheet entrance 101. The rotating speed of the second motor M2 is high and the required sheet-feeding speed is slow. Through the above-mentioned arrangement, the rotating speed of the preliminary feeding roller 513 slows down in order to meet the requirement of the sheet-feeding speed.

Figure 4B:
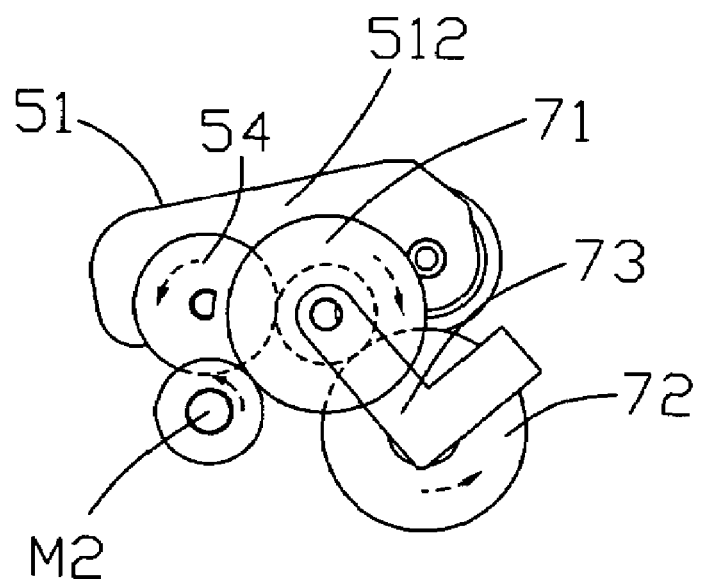

Please refer to FIG. 4(B) and FIG. 3, the second motor M2 revolves counterclockwise, so that, the passive gear 71 revolves clockwise and the floating gear 72 revolves counterclockwise and rises. At the same time, the swimming gear 54 and the axle 511 are driven to revolve counterclockwise. Then, the axle 511 drives the feeding roller 514 to revolve counterclockwise, the rear swimming gear 516 drives the front running gear 515 to revolve counterclockwise through the middle gear 517. While the second motor M2 revolves counterclockwise, the unidirectional clutch OW1 does not drive the preliminary feeding roller 513 to revolve. The unidirectional clutch OW1 only drives the bracket 512 to revolve counterclockwise around the axle 511. Therefore, the front portion of the bracket raises, as a result, the preliminary feeding roller 513 leaves the sheet located at the sheet entrance 101.

Figure 5:
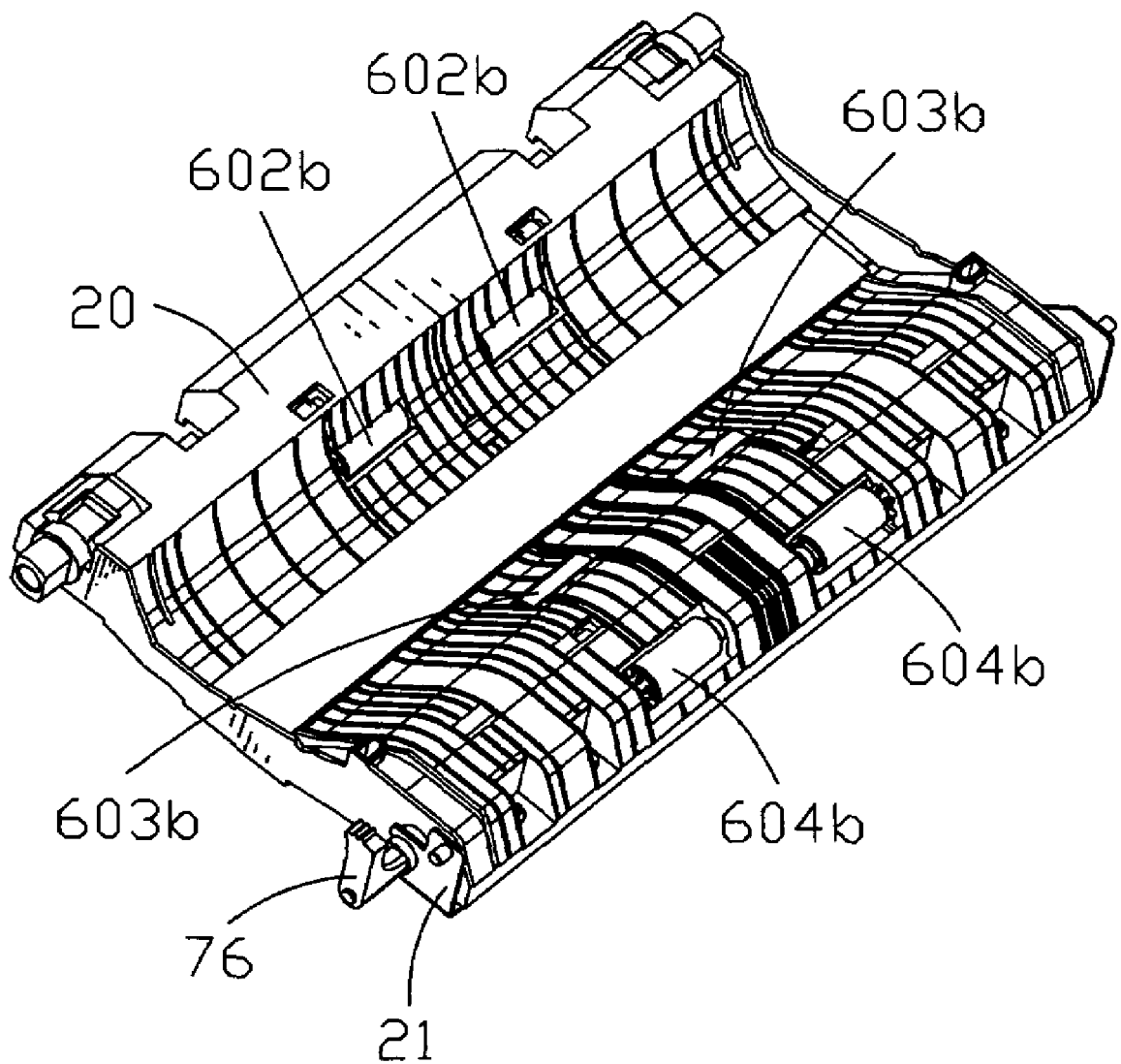
FIG. 5 is a perspective view of a base.
Figure 6:
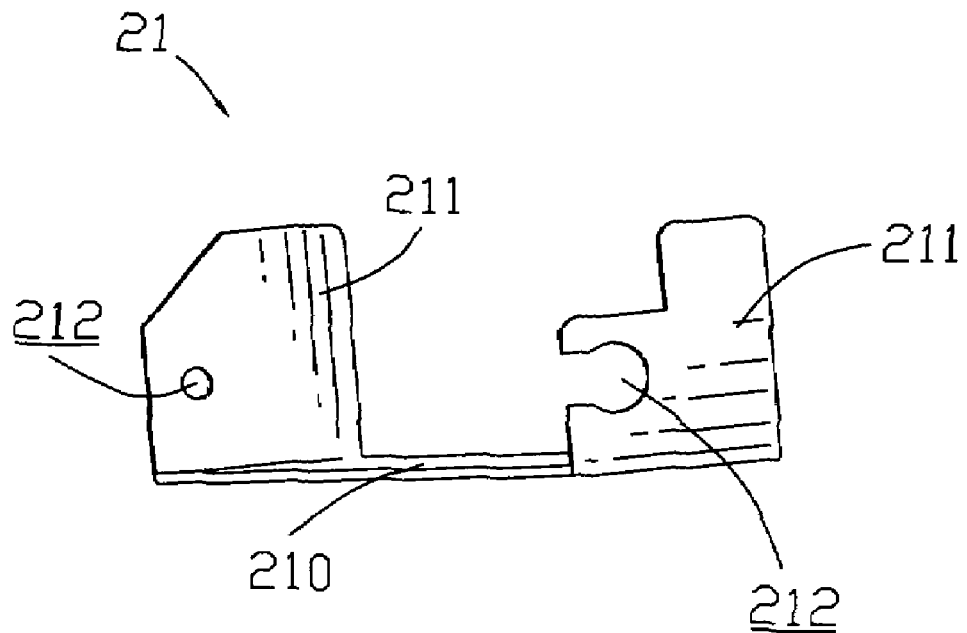
FIG. 6 is a perspective view of a brace of the base shown in FIG. 5.
Figure 7:
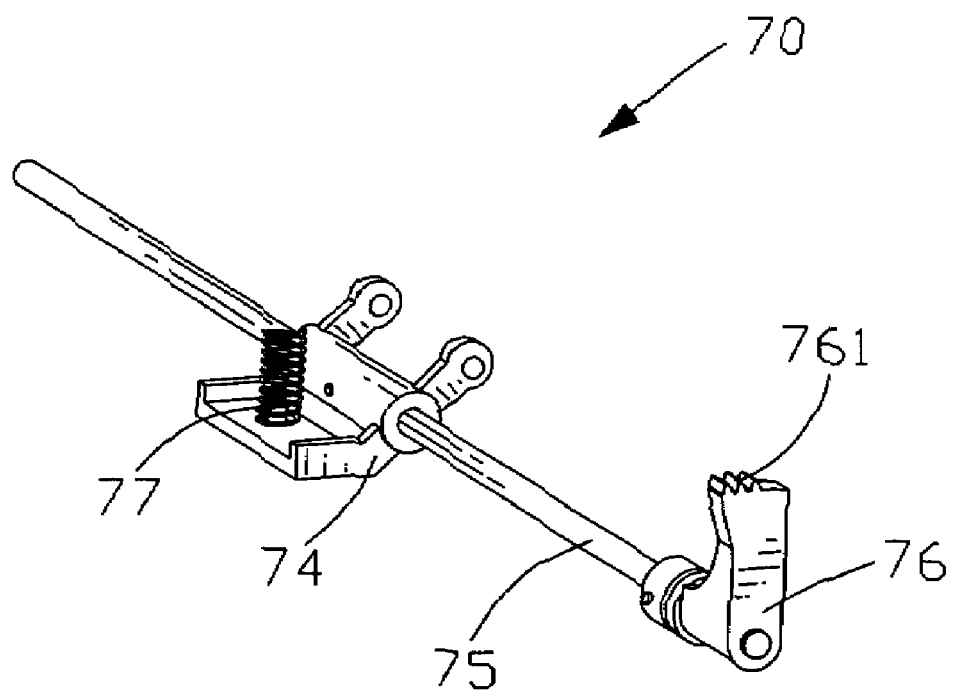
FIG. 7 is a perspective view of a prop assembly.

As shown FIG. 5 and FIG. 7, a prop assembly 70 is installed in the base 20. The prop assembly 70 comprises a brace 21 arranged in the base 20 and fixed below the exit driven roller 604b, a prop axel 75, a swimming arm 74, a twist arm 76 and a spring component 77. The brace 21 comprises a floor 210 and two support boards 211 vertical fixed on the floor 210. Each support board 211 has an aperture 212 (as shown in FIG. 6).

Figure 8:
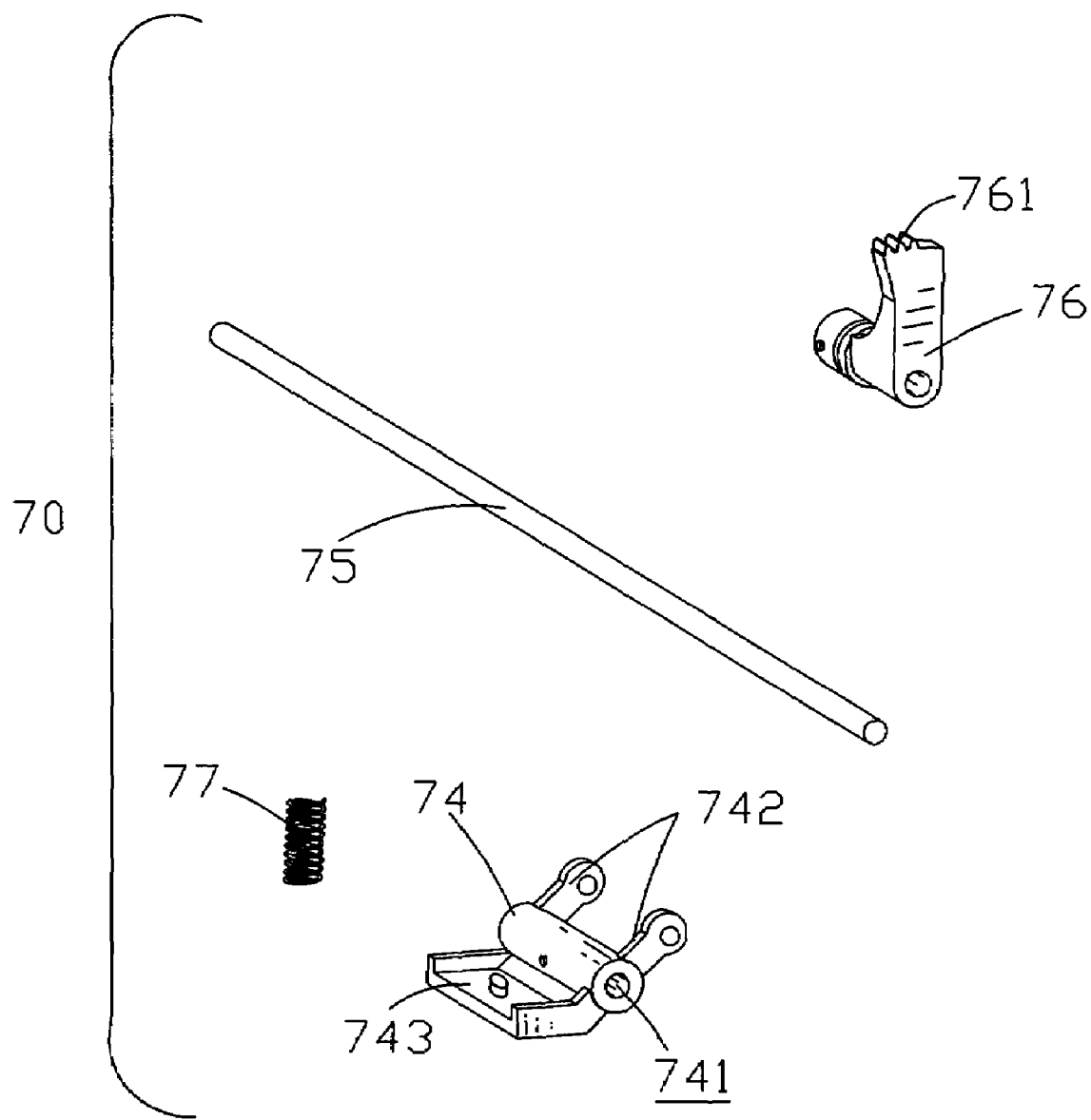
FIG. 8 is an exploded view of the prop assembly shown in FIG. 7.

Please refer to FIG. 6 to FIG. 8, the twist arm 76 has a plurality of teeth 761 for contacting with the floating gear 72, and the end of the twist arm 76 is fixed at one end of the prop axel 75. The prop axel 75 is pivotally fixed in the apertures 212. A bushing hole 741 is formed on the middle of the swimming arm 74 for allowing the prop axel 75 to be sleeved on and firmly engaged with the swimming arm 74. Support arms 742 are fixed on the front portion of the swimming arm 74 to support the exit driven roller 604b. A support board 743 is formed on the rear portion of the swimming arm 74 to install the spring component 77 thereon.

Figure 9:
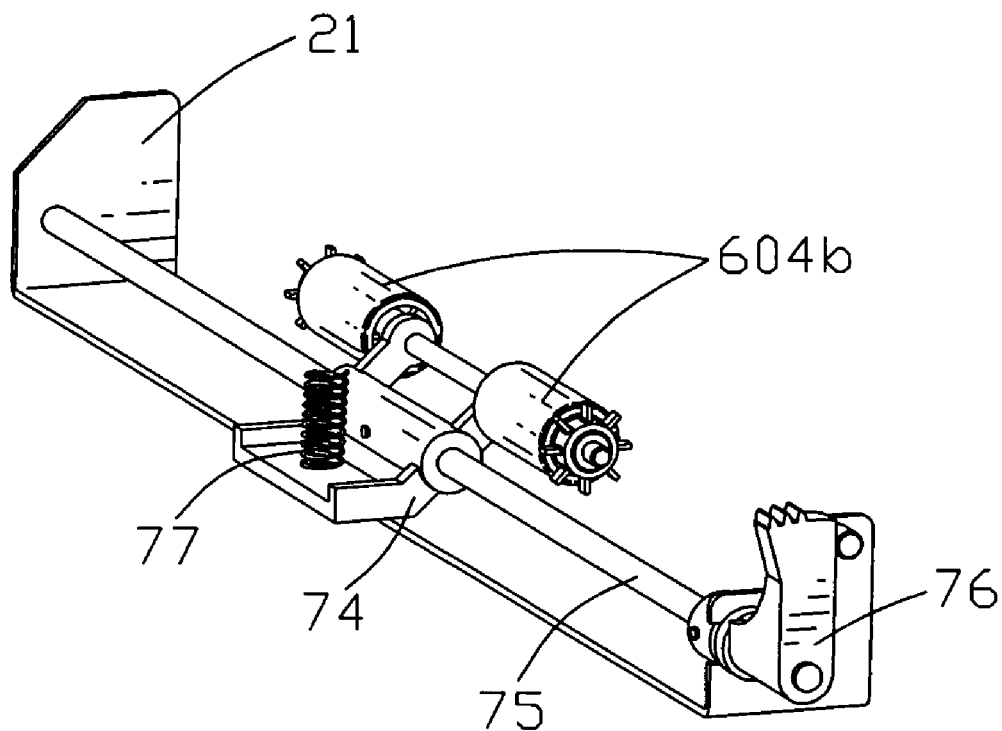
FIG. 9 is a perspective view, showing the prop assembly connected with the brace of the base.

FIG. 9 shows the prop assembly 70 connects with the brace 21 of the base 20. The exit driven roller 604b is fixed on the support arms 742 of the swimming arm 74. Each end of the prop axel 75 is inserted into the apertures 212, respectively. The twist arm 76 is arranged at the outside of the brace 21.

Figure 10:
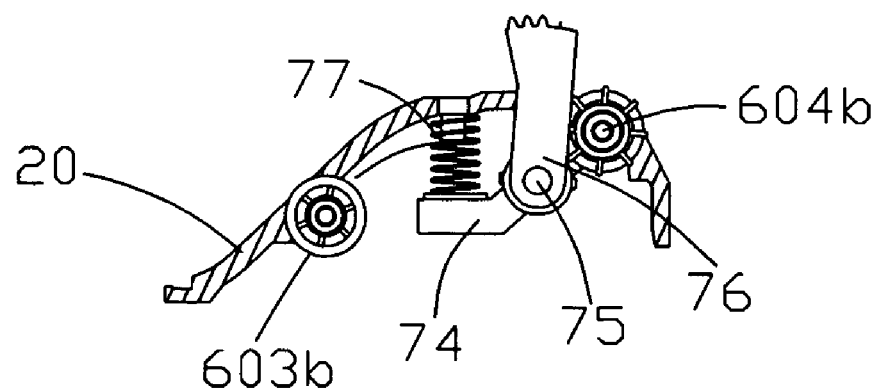
FIG. 10 is a plane view, showing the prop assembly engaged with a driven roller and the brace.

FIG. 10 is cross-sectional view of the prop assembly 70 and the exit driven roller 604b arranged in the base 20. The swimming arm 74, the prop axel 75 and the spring component 77 are arranged in the interior of the base 20. The spring component 77 is engaged with the swimming arm 74 and the base 20. The twist arm 76 is arranged at the outside of the base 20 (referring to FIG. 5).

Figure 11:
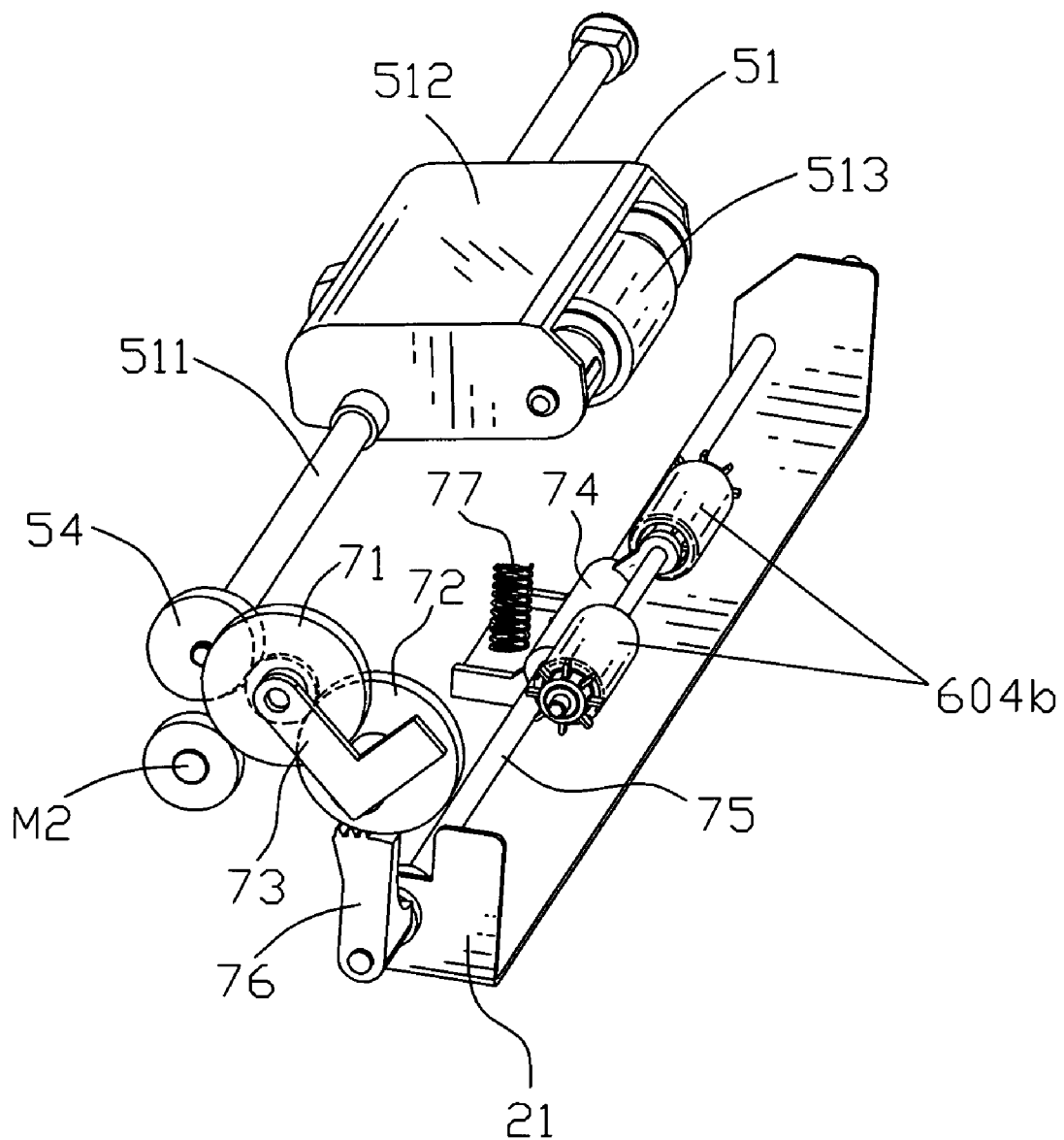
FIG. 11 is a perspective view of a sheet-fetching assembly engaged with the brace and the prop assembly.

As shown FIG. 11, the twist arm 76 lies below the floating gear 72. While the passive gear 71 drives the floating gear 72 remove downward, the floating gear 72 contacts with the teeth 761 to drive the twist arm 76 together with the prop axel 75 to rotate clockwise. Then, the exit driven roller 604b separates with the exit driving roller 604a. On the contrary, while the passive gear 71 drives the floating gear 72 to move upward, the exit driven roller 604b gets in touch with the exit driving roller 604a. The detailed operation is described below.

Figure 12A:
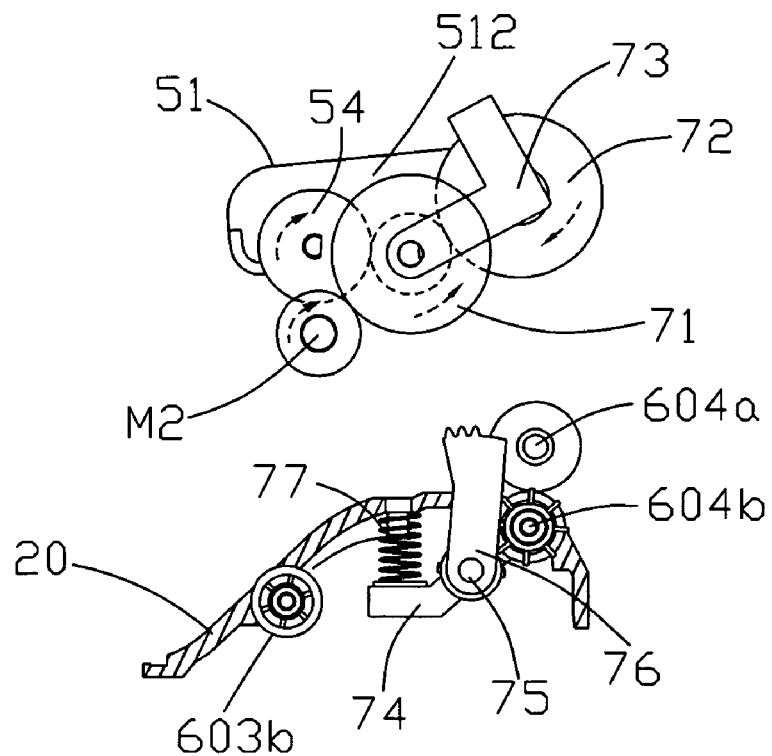
FIGS. 12(A) to 12(C) are explanatory plane views, showing a driving roller connecting with and separating from a driven roller.

As indicated in FIG. 12(A), the floating gear 72 doesn't touch the twist arm 76 and the spring component 77 withstands the swimming arm 74, therefore, the swimming arm 74 contacts with the exit driven roller 604b. While the second motor M2 rotates clockwise, the passive gear 71 rotates counterclockwise. The floating gear 72 rotates clockwise and descends, so that the front portion of the bracket 512 descends.

Figure 12B:
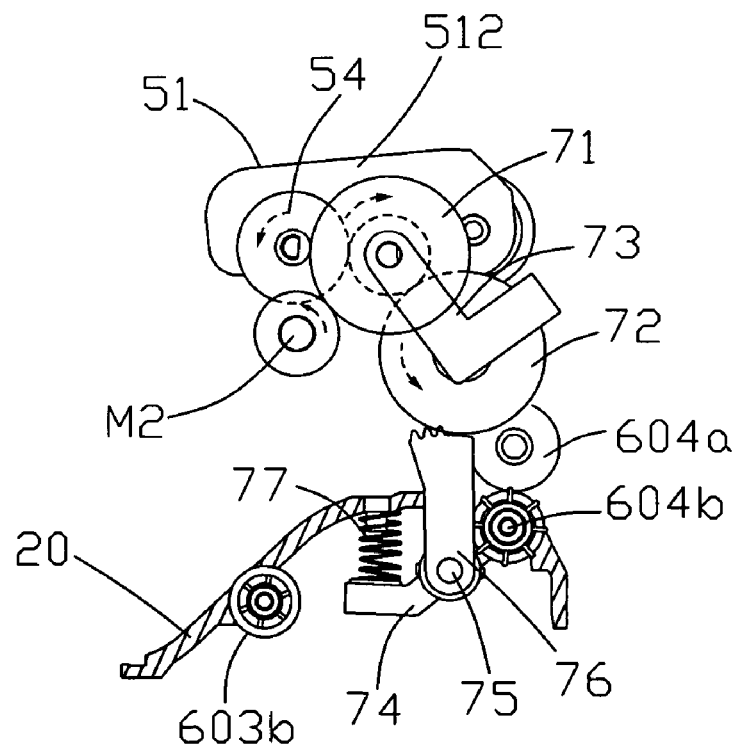

As indicated FIG. 12(B), the floating gear 72 rotates clockwise and descends to contact with the teeth 761, at the same time, the preliminary feeding roller 513 begins to fetch the sheet. When the motion of sheet-fetching is ended, the second motor M2 begins to drive counterclockwise rotating.

Figure 12C:
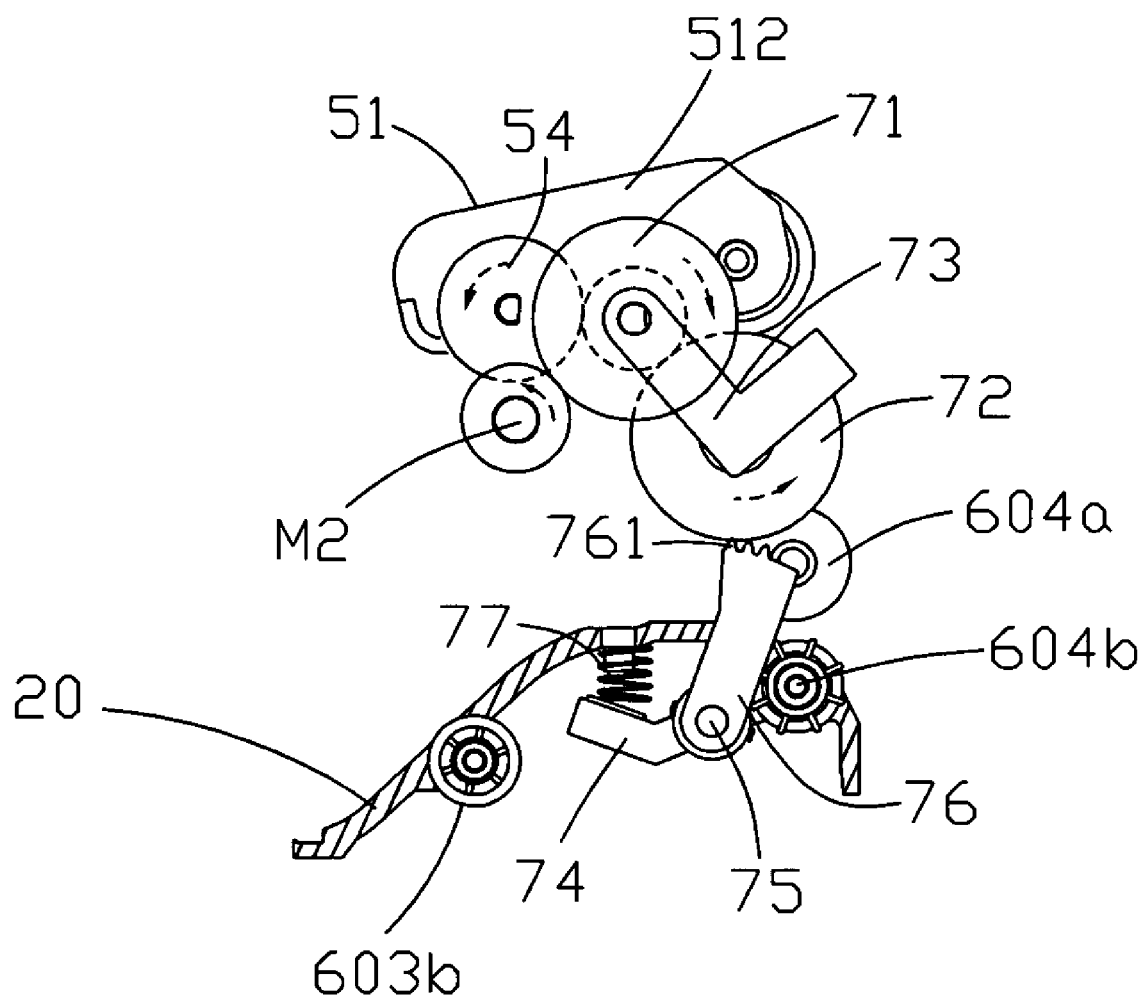

Please refer to FIG. 12(C), while the second motor M2 rotates counterclockwise, the passive gear 71 rotates clockwise and the floating gear 72 rotates counterclockwise and ascends. The front portion of the bracket 512 ascends. While the floating gear 72 rotates counterclockwise and ascends, the twist arm 76 has a deflection clockwise. The twist arm 76 drives the prop axel 75 and the swimming arm 74 deflecting clockwise, and then the exit driven roller 604b descends and separates from the exit driving roller 604a. The spring component 77 is compressed. Then, the floating gear 72 ascends and separates from the twist arm 76. The compressed spring component 77 drives the swimming arm 74 to rotate counterclockwise and return to the original location. The prop axel 75, the exit driving roller 604a and the twist arm 76 revolve counterclockwise and return to the original position, so that the exit driving roller 604a withstands the exit driven roller 604b again.

Figure 13A:
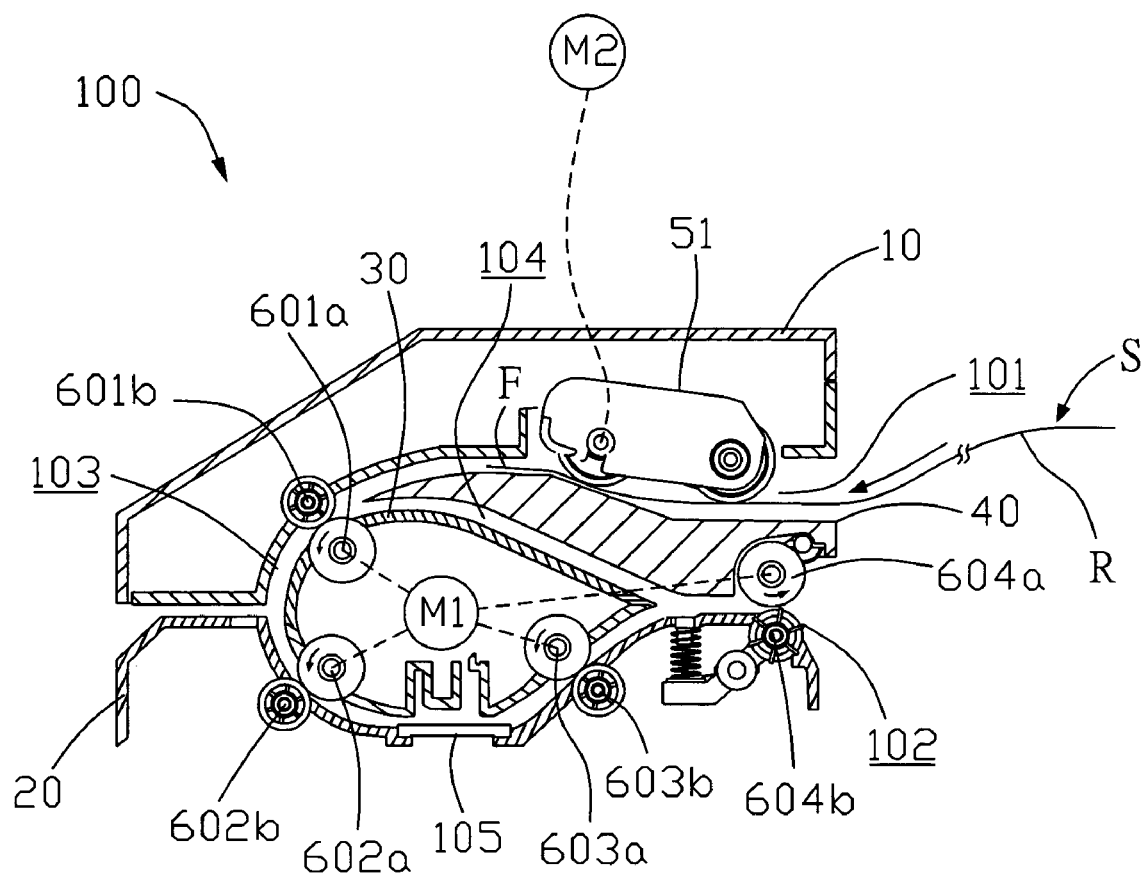
FIGS. 13(A) to 13(D) are explanatory cross-sectional views, showing the operation of the sheet-handling apparatus.
Figure 13B:
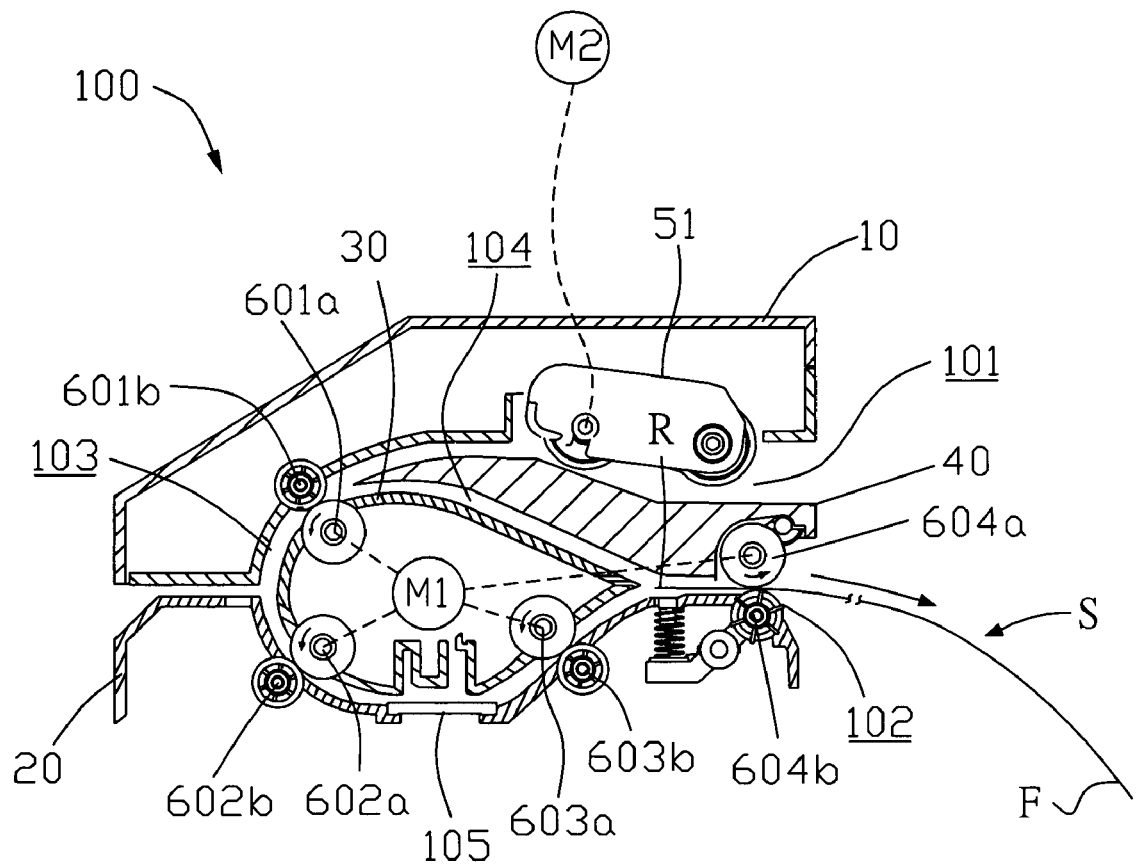
Figure 13C:
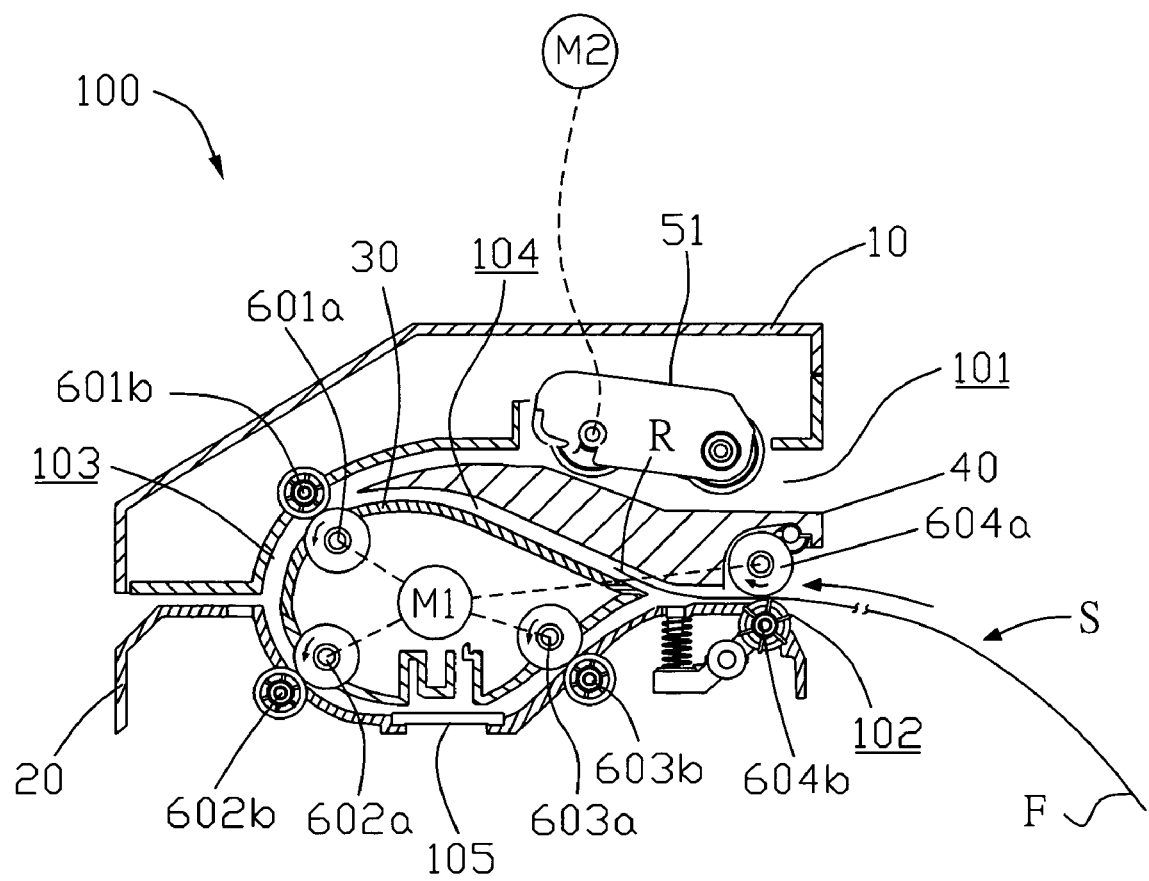
Figure 13D:
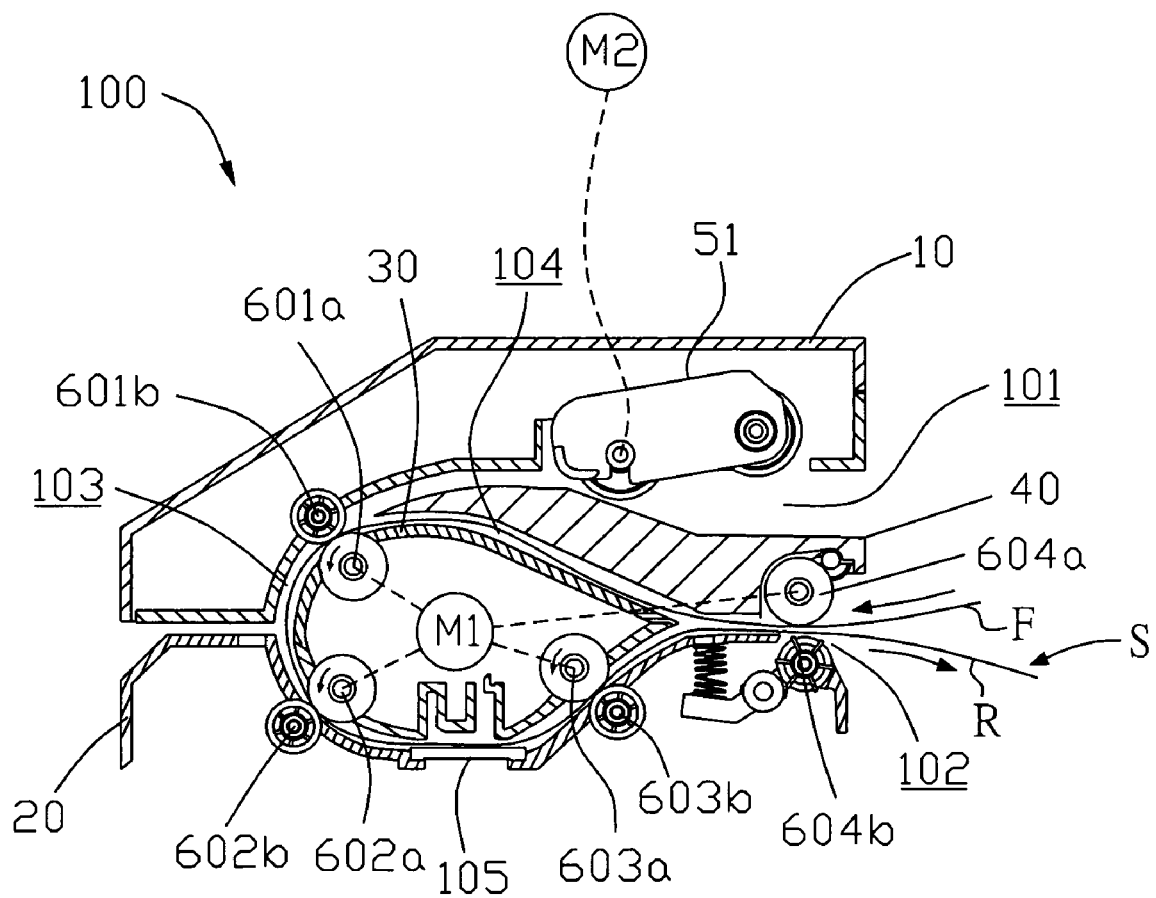

Please refer to FIGS. 13(A), (B), (C) and (D), illustrating the operation of the sheet-handling apparatus 100 of the present invention. While a sheet S located in the sheet entrance 101, the sheet-fetching assembly 51 driven by the second motor M2 fetches the sheet S and delivers the sheet S into the first channel 103 (as shown in FIG. 13(A)). The first motor M1 drives the driving rollers 601a, 602a and 603a to rotate counterclockwise, the driving rollers 601a, 602a and 603a send the sheet S to the processing window 105, then the front end F of the sheet S is sent to the exit driving roller 604a and the exit driven roller 604b. The first motor M1 drives the exit driving roller 604a to rotate counterclockwise, so that the exit driving roller 604a and the exit driven roller 604b send the sheet S to the outside (referring to FIG. 13(B)). Referring to FIG. 13(C), the first motor M1 drives the driving roller 601a, 602a and 603a to rotate counterclockwise and the exit driving roller 604a to rotate clockwise, so that, the rear end R of the sheet S is sent into the second channel 104 and then sent into the first channel 103. While the second motor M2 rotates counterclockwise, the sheet-fetching assembly 51 ascends, at the same time, the exit driving roller 604a separates from the exit driven roller 604b(as shown FIG. 13(D)). The rear end R of the sheet S is sent to the sheet exit 102, the front F of the sheet S is sent to the second channel 104. Then, the front end F of the sheet S completely enters into the second channel 104 and then sent into the first channel 103, the exit driving roller 604a touches the exit driven roller 604b, the sheet S is sent to the sheet exit 102.

According to this invention, the sheet-handling apparatus 100 has the exit driving roller 604a and the exit driven roller 604b located at the sheet exit 102. The second motor M2 drives the exit driven roller 604b to separate from the exit driving roller 604a. The first motor M1 drives the driving rollers 601a, 602a, 603a and the exit driving roller 604a to rotate. Therefore, there are only two motors M1 and M2 provided in the sheet-handling apparatus 100 of the present invention. The structure of the sheet-handling apparatus 100 is simplified.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A sheet-handling apparatus, comprising:
  a base located at the lower end of the sheet-handling apparatus;
  an inner cover covering on the base, the base and the inner cover forming a cavity;
  a guidance assembly installed between the base and the inner cover;
  a top cover covering the inner cover, the guidance assembly and the base;
  a first channel located between the guidance assembly and the base and between the guidance assembly and the top cover;
  a second channel located between the inner cover and the guidance assembly, the second channel communicating with the first channel;
  a sheet entrance formed at the outer end of the second channel;
  a sheet exit formed at the outer end of the first channel;
  a sheet-fetching assembly contained in the top cover, the sheet-fetching assembly including:
    a second motor;
    a feeding roller having an axle and a swimming gear engaged at the end of the axle in order to be driven by the second motor; a preliminary feeding roller driven by the feeding roller;
    a bracket partially covering the feeding roller and the preliminary feeding roller;
    a front swimming gear engaged with the preliminary feeding roller;
    a rear swimming gear engaged with the feeding roller;
    a unidirectional clutch located between the front swimming gear and the preliminary feeding roller and engaged with the bracket;
    a middle gear engaged between the front swimming gear and the rear swimming gear so that the preliminary feeding roller is driven by the feeding roller;
    a passive gear engaged with and driven by the second motor;
    a floating gear meshing with the passive gear;
    a connecting arm engaging with the passive gear and the floating gear so that the floating gear revolves around the passive gear;
  a prop assembly installed in the base, including:
    a brace arranged in the base;
    a prop axel engaged in the brace;
    a twist arm fixed at one end of the prop axel, the twist arm having a plurality of teeth for contacting with the floating gear;
    a swimming arm sleeved and firmly engaged with the prop axel;
    a spring component installed on a support board of the swimming arm;
  a first motor arranged in the cavity formed by the base and the inner cover;

a plurality of driving rollers arranged along the first channel and driven by the first motor; and a plurality of driven rollers driven by the driving rollers, respectively.

2. The sheet-handling apparatus as set forth in claim 1, wherein the swimming arm has a plurality of support arms formed on the front portion of the swimming arm to support one of the driven rollers and a support board formed on the rear portion of the swimming arm to install the spring component.

3. The sheet-handling apparatus as set forth in claim 2, wherein one end of the spring component is fixed on the support board.

4. The sheet-handling apparatus as set forth in claim 1, wherein the brace is formed by a floor and two support boards vertical fixed on the floor, each the support board has an aperture to be engaged with the prop axel.

5. A sheet-handling apparatus as set forth in claim 1, the base further comprising a processing window.

6. A sheet-handling apparatus as set forth in claim 1, wherein the driving rollers and driven rollers are arranged along the first channel.

\* \* \* \* \*